(12) United States Patent
Nielsen et al.

(10) Patent No.: US 9,007,982 B2
(45) Date of Patent: *Apr. 14, 2015

(54) FREQUENCY LAYER CONVERGENCE METHOD FOR MBMS

(71) Applicant: Core Wireless Licensing S.A.R.L., Luxembourg (LU)

(72) Inventors: Sari Nielsen, Espoo (FI); Luis Barreto, Camberley (GB); Quan Tat, Reading (GB); Kimmo Kettunen, Espoo (FI); Jussi Numminen, Turku (FI)

(73) Assignee: Core Wireless Licensing S.A.R.L., Luxembourg (LU)

( * ) Notice: Subject to any disclaimer, the term of this patent is extended or adjusted under 35 U.S.C. 154(b) by 118 days.

This patent is subject to a terminal disclaimer.

(21) Appl. No.: 13/623,440

(22) Filed: Sep. 20, 2012

(65) Prior Publication Data

US 2013/0077553 A1     Mar. 28, 2013

Related U.S. Application Data

(63) Continuation of application No. 10/935,323, filed on Sep. 8, 2004, now Pat. No. 8,300,593.

(30) Foreign Application Priority Data

Apr. 16, 2004   (GB) .................................. 0408568.4

(51) Int. Cl.
*H04W 72/04*   (2009.01)
*H04W 48/20*   (2009.01)
(Continued)

(52) U.S. Cl.
CPC .............. *H04W 72/04* (2013.01); *H04W 36/08* (2013.01); *H04W 48/20* (2013.01); *H04W 72/005* (2013.01)

(58) Field of Classification Search
None
See application file for complete search history.

(56) References Cited

U.S. PATENT DOCUMENTS

| 6,144,653 | A | * | 11/2000 | Persson et al. | 370/337 |
| 6,223,037 | B1 | * | 4/2001 | Parkkila | 455/434 |
| 6,701,150 | B1 | | 3/2004 | Huang et al. | |

(Continued)

FOREIGN PATENT DOCUMENTS

| CN | 1455538 | 11/2003 |
| EP | 1509056 | 2/2005 |

(Continued)

OTHER PUBLICATIONS

3GPP TS 25.304, Mar. 2004, V5.4, Technical Specification Group Radio Access Network;User Equipment (UE) procedures in idle mode and procedures for cell reselection in connected mode.*

(Continued)

*Primary Examiner* — Ian N Moore
*Assistant Examiner* — Lakeram Jangbahadur
(74) *Attorney, Agent, or Firm* — Core Wireless Licensing S.A.R.L.

(57) ABSTRACT

A method to control cell selection and/or re-selection in a communication system comprising a plurality of cells with which terminal devices may communicate, the method including the steps of: determining that a terminal device is to start a session for a certain service, the service using a reception frequency; based on that determination, changing at least one cell selection and/or re-selection parameter in respect of the terminal device with the effect that a subsequent cell selection and/or re-selection performed by the device would favor cells that use the reception frequency used in the service session over other cells.

35 Claims, 5 Drawing Sheets

(51) Int. Cl.
*H04W 36/08* (2009.01)
*H04W 72/00* (2009.01)

(56) References Cited

U.S. PATENT DOCUMENTS

| | | | |
|---|---|---|---|
| 7,054,635 B1* | 5/2006 | Ritzen et al. | 455/444 |
| 7,277,706 B2* | 10/2007 | Hurtta et al. | 455/435.1 |
| 7,307,971 B2* | 12/2007 | Park et al. | 370/331 |
| 7,336,659 B2* | 2/2008 | Meago | 370/390 |
| 2001/0031638 A1* | 10/2001 | Korpela et al. | 455/449 |
| 2001/0046879 A1 | 11/2001 | Schramm et al. | |
| 2003/0050097 A1 | 3/2003 | Amirijoo et al. | |
| 2003/0073453 A1* | 4/2003 | Basilier | 455/503 |
| 2003/0088695 A1* | 5/2003 | Kwak et al. | 709/238 |
| 2003/0207696 A1 | 11/2003 | Willenegger et al. | |
| 2004/0008646 A1 | 1/2004 | Park et al. | |
| 2004/0081125 A1 | 4/2004 | Ranta-Aho et al. | |
| 2004/0137885 A1 | 7/2004 | Sarkkinen et al. | |
| 2004/0180675 A1* | 9/2004 | Choi et al. | 455/458 |
| 2004/0185837 A1* | 9/2004 | Kim et al. | 455/414.3 |
| 2004/0202140 A1* | 10/2004 | Kim et al. | 370/335 |
| 2004/0229629 A1 | 11/2004 | Yi et al. | |
| 2004/0259565 A1 | 12/2004 | Lucidarme | |
| 2005/0041608 A1* | 2/2005 | Jeong et al. | 370/310 |
| 2005/0070277 A1 | 3/2005 | Hu | |
| 2005/0090278 A1* | 4/2005 | Jeong et al. | 455/525 |
| 2005/0118992 A1 | 6/2005 | Jeong et al. | |
| 2005/0232292 A1 | 10/2005 | Richards et al. | |
| 2005/0250529 A1* | 11/2005 | Funnell et al. | 455/525 |
| 2005/0277416 A1 | 12/2005 | Tolli et al. | |
| 2006/0056347 A1* | 3/2006 | Kwak et al. | 370/329 |
| 2006/0258355 A1 | 11/2006 | Olvera-Hernandez et al. | |
| 2009/0264133 A1* | 10/2009 | Lee et al. | 455/436 |
| 2009/0323624 A1* | 12/2009 | Kim | 370/329 |

FOREIGN PATENT DOCUMENTS

| | | |
|---|---|---|
| GB | 2377855 | 1/2003 |
| GB | 2398971 | 1/2004 |

OTHER PUBLICATIONS

3GPP TS 25.346, Mar. 2004, V6.0, Technical Specification Group Radio Access Network, Introduction to Multimedia Broadcast Multicast Service (MBMS) in Radio Access Network (RAN).*

3GPP; Technical Specification Group Radio Access Network; User Equipment (UE) Procedures in Idle Mode and Procedures for Cell Reselection in Connected Mode (Release 5), 3GPP TS 25.304 V5.3.0, Jun. 2003, pp. 17-27.

3GPP-TS 25.346 V6.0.0, "311 Generation Partnership Project; Technical Specification Group Radio Access Network; Introduction of the Multimedia Broadcast Multicast Service (MBMS) in the Radio Access Network (RAN); Stage 2 (Release 6)" XP-002334083, Mar. 2004, pp. 1-50.

3GPP-TS 25.304 V5.4.0, "3'd Generation Partnership Project; Technical Specification Group Radio Access Network; USER Equipment (UE) procedures in idle mode and procedures for cell reselection in connected mode; (Release 5)" XP-002307036, Mar. 2004, pp. 1-41.

* cited by examiner

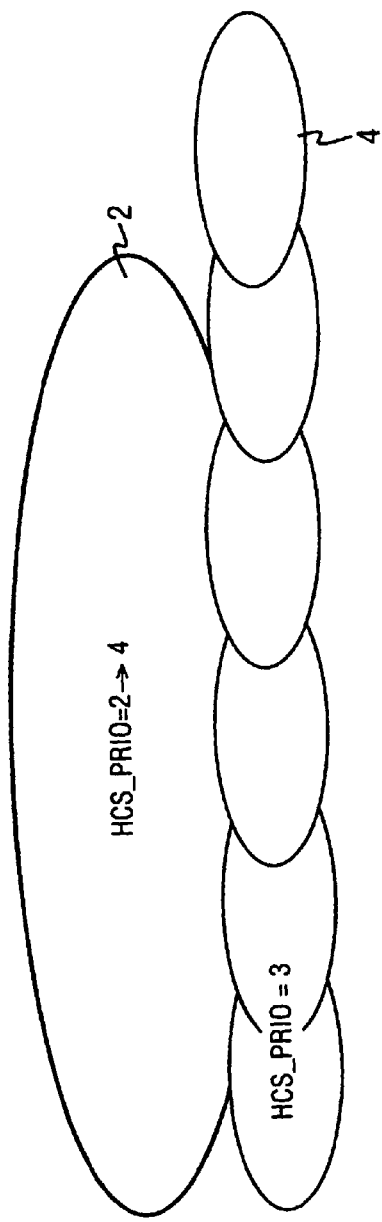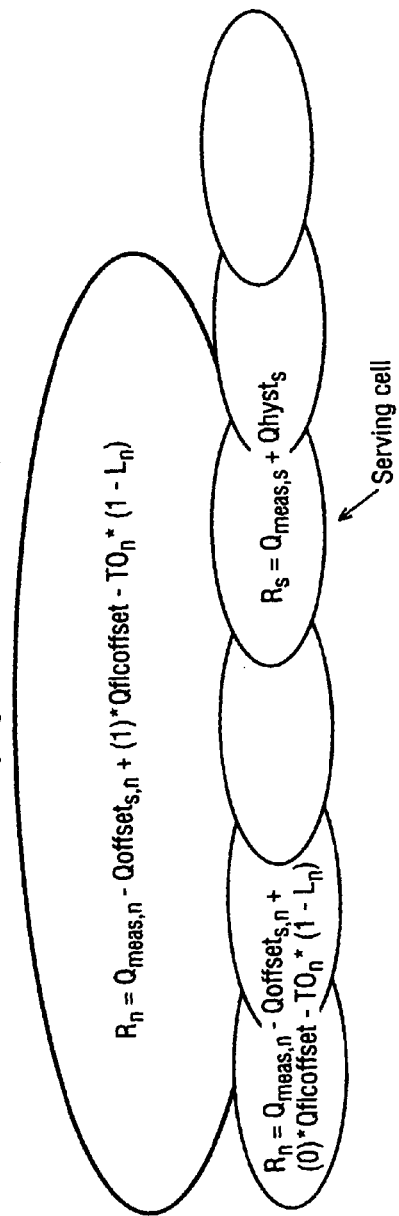

Session start

Session stop

FREQUENCY LAYER CONVERGENCE METHOD FOR MBMS

CROSS REFERENCE TO RELATED APPLICATION

This application is a continuation of U.S. patent application Ser. No. 10/935,323, filed on Sep. 8, 2004 which is now U.S. Pat. No. 8,300,592. U.S. patent application Ser. No. 10/935,323 is based upon and claims the benefit of priority from British Patent Application No. 0408568.4, filed Apr. 16, 2004, of which the contents are incorporated herein by reference.

FIELD OF THE INVENTION

The present invention relates primarily to a method for providing a multimedia broadcast multicast service (MBMS). In an embodiment of the invention an MBMS is provided in a radio access network (RAN). However, it is envisaged that embodiments of the present invention may also be utilized in providing other types of service in a RAN. Specifically, the present invention may be implemented in a mobile telecommunications network.

BACKGROUND OF THE INVENTION

A problem with implementing MBMS is that where there are cells on different frequency layers, with a distribution of MBMS subscribers across the different frequency layers, system capacity can be wasted if the same MBMS data stream is transmitted on the different frequency layers to UEs in the same geographical coverage area. Examples include overlapping cells, whether co-located or not. The term "co-location" in general is understood as cells on different frequencies have the same base station site i.e. the transmission of two or more carrier frequencies happens from the same base station site. However, in practice the network may have two or more carrier frequencies, which have different cell sizes and therefore at least not all cells are co-located although the coverage of these different frequency layers are overlapping in a given geographical area. Hence, the problem does not only occur in co-located case but in all case and areas where the network has cell coverage on more than one frequency and therefore a network operator would like to provide MBMS service only on one of the carrier frequencies (or at least not on all carrier frequencies)

3GPP TS 25.346 v6.0.0 discusses general structural and functional aspects of providing MBMS in a RAN. Currently 25.346 v.6.0.0 defines frequency layer convergence as follows:

"Frequency Layer Convergence denotes the process where the UTRAN requests UEs to preferentially re-select to the frequency layer on which the MBMS service is intended to be transmitted. This layer preference could be done by an additional MBMS session related Layer Convergence Information (LCI) such as offset and target frequency. These kinds of information could be given to UEs at session start and during the whole session, and will be applied during the entire session. More than one offset may be required to support multiple frequencies, but it is assumed that the same LCI information will apply to all the services on the same frequencies."

R2-031716, 3GPP TSG RAN WG2 meeting #37 Budapest, Hungary, Aug. 25-29, 2003 proposes frequency layer convergence (FLC) for MBMS.

R2-032077, TSG RAN WG2 meeting #38 Sophia Antipolis, France, Sep. 6-10, 2003 discloses a UE layer convergence mechanism for MBMS.

R2-040086, TSG RAN WG2 meeting #38 Sophia Antipolis, France, Sep. 6-10, 2003 discusses different alternatives for layer convergence and possible MBMS frequency layer convergence procedures.

3GPP TS 25.346 v6.0.0 discusses general structural and functional aspects of providing MBMS in a RAN. Currently 25.346 v.6.0.0 defines frequency layer convergence as follows:

"Frequency Layer Convergence denotes the process where the UTRAN requests UEs to preferentially re-select to the frequency layer on which the MBMS service is intended to be transmitted. This layer preference could be done by an additional MBMS session related Layer Convergence Information (LCI) such as offset and target frequency. These kinds of information could be given to UEs at session start and during the whole session, and will be applied during the entire session. More than one offset may be required to support multiple frequencies, but it is assumed that the same LCI information will apply to all the services on the same frequencies."

The intention behind the FLC concept is to maximise the point-to-multipoint (p-t-m) connections for an MBMS session, from the radio network controller (RNC) point of view. This is because MBMS in point-to-point (p-t-p) would not present many advantages over R99 DCH connections since the same radio resources are consumed. Thus, FLC reduces system capacity wastage in that where there is overlapping cell coverage on different frequency layers, with a distribution of MBMS subscribers across the different frequency layers, the MBMS subscribers are moved onto the same frequency layer thereby negating the need to transmit the same MBMS data stream on multiple different frequency layers to UEs in the same geographical coverage area.

The discussion in 25.346 v.6.0.0 and the proposals in documents R2-031716, R2-032077 and R3-040086 do not define the details required to implement a frequency layer convergence method for MBMS but instead discuss generally the requirements for frequency layer convergence.

It is currently not possible to converge a UE to a certain cell or frequency, which is different from the one that would be selected or reselected based on the normal cell reselection criteria in the following radio resource control (RRC) states: Idle, CELL_FACH, CELL_PCH. Furthermore, it is also not possible to keep the UE on a preferred MBMS frequency layer when the cell reselection criteria indicate a cell on another carrier frequency to be better and no there is no cell barring.

SUMMARY OF THE INVENTION

It is an aim of the present invention to solve one or more of the above-identified problems.

Aspects of the invention are set out in the claims.

According to an embodiment of the present invention not all MBMS capable UEs should reselect to the MBMS layer. Rather, only the UEs that start an MBMS session will move to the MBMS layer. This avoids all MBMS UEs reselecting always to the same frequency and minimizes the migration trend of MBMS UEs towards the same cells. For example, this feature prevents migration of MBMS UEs towards bigger cells in the case where a macro layer is the preferred MBMS layer and a micro layer is the preferred normal HCS layer.

Preferably, the FLC feature is only applicable for MBMS capable UEs. However, it is envisaged that embodiments of the present invention may also be utilized in providing other types of service in a RAN.

Preferably, the FLC is active after notification. An MBMS notification indicator channel (MICH) may be provided in the cells. Furthermore, an MBMS point-to-point traffic channel (MCCH) may also be provided in the cells. The MCCH that is sent on cells that are not on the preferred MBMS frequency may not have all the data that is available in the MCCH sent on the preferred MBMS layer. But the MCCH that is sent in cells that are not on the preferred MBMS frequency contains the parameters needed for FLC. If the MCCH is not transmitted in cells together with MICH, then the FLC parameters should be (e.g.) broadcast in system information. This is less preferable.

Preferably, there is an explicit session stop to indicate disabling the FLC. The network is able to switch this feature ON/OFF, with the start/finish of the MBMS session. The UE uses the FLC related cell reselection parameters and criteria during the MBMS session only (The FLC is only available per MBMS session).

The changing step preferably comprises setting a parameter so as to encourage the terminal device to select or re-select a cell more promptly. This may be done by triggering immediate selection or reselection or by altering a threshold so as to make selection or reselection more likely.

Embodiments of the invention preferably provide a solution for frequency layer convergence for MBMS, which does not conflict with the existing cell reselection criteria and allows minimum changes to the cell reselection criteria. The invention introduces a solution for networks, with and without HCS (Hierarchical Cell Structure).

The network could send an FLC parameter upon notification.

BRIEF DESCRIPTION OF THE DRAWINGS

Embodiments of the present invention will now be described by way of example with reference to the accompanying drawings in which:—

FIG. 1 is a schematic diagram showing an embodiment of the present invention in a network having a hierarchical cell structure;

FIG. 2 is a schematic diagram showing an embodiment of the present invention in a network not having a hierarchical cell structure where the serving cell is not on the MBMS layer;

DETAILED DESCRIPTION OF EMBODIMENTS OF THE INVENTION

Figure 3:
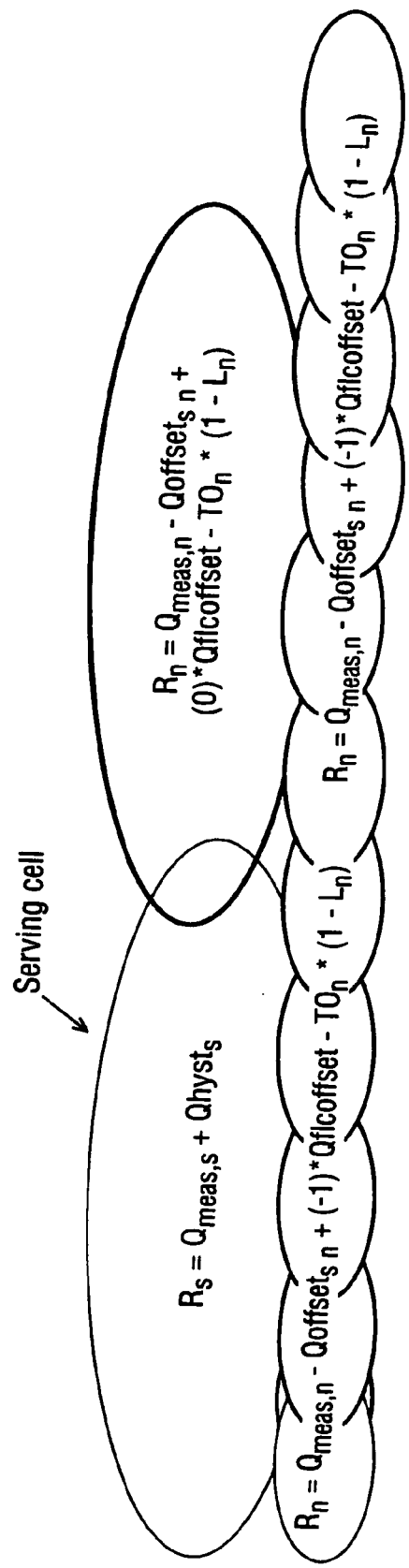
FIG. 3 is a schematic diagram showing an embodiment of the present invention in a network not having a hierarchical cell structure where the serving cell is on the MBMS layer.
Figure 4:
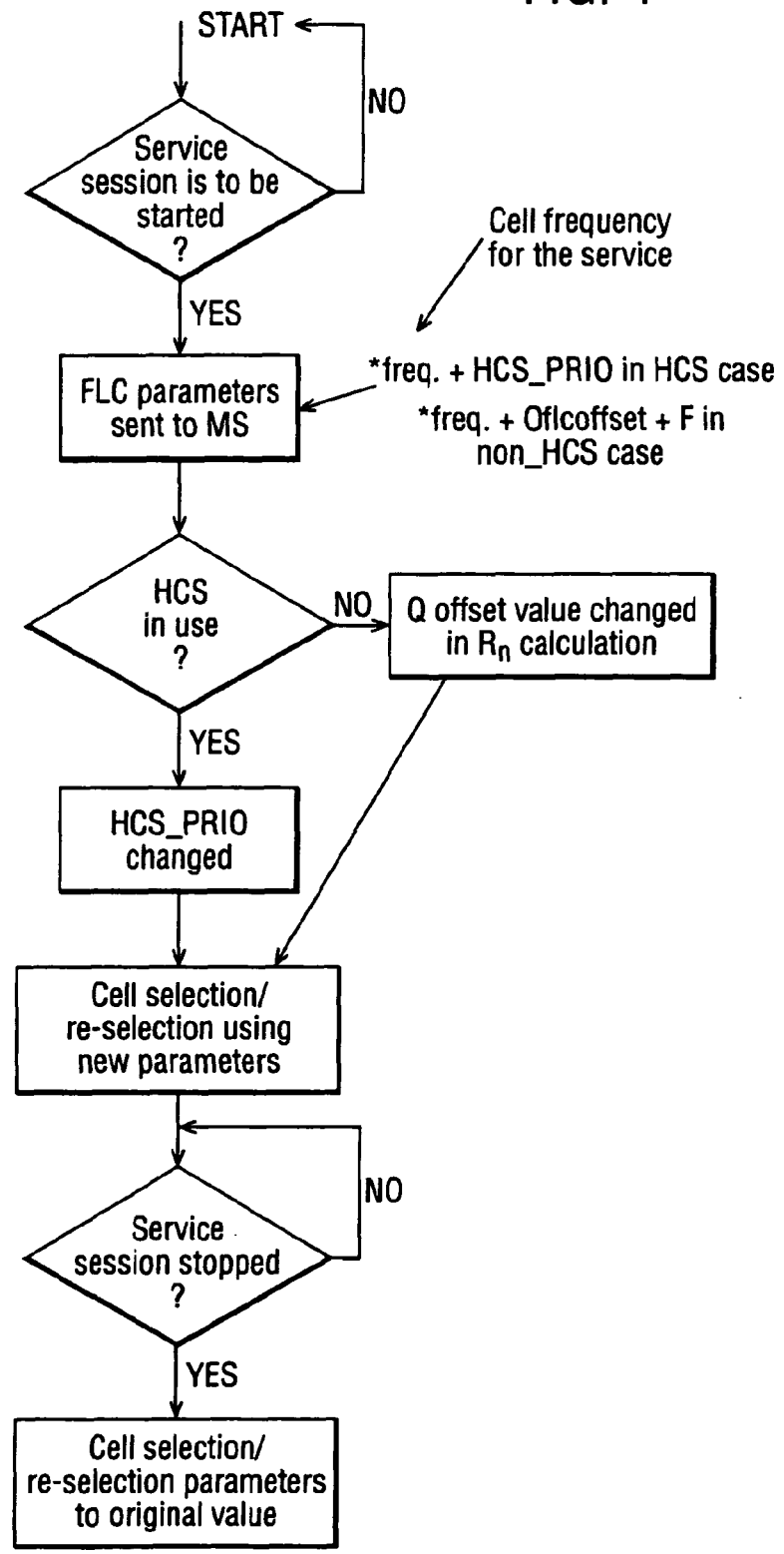
FIG. 4 is a flow diagram illustrating the steps in an embodiment of the method of the present invention.

FIG. 1 is shows a schematic diagram of a portion of a network having a hierarchical cell structure. The network comprises a macro-cell 2 and a plurality of micro-cells 4. The macro-cell comprises the MBMS layer while the micro-cells comprise the non-MBMS layer. Associated with the cells is a HCS priority represented by the parameter HCS_PRIO. Accordingly, a value for HCS_PRIO is associated with the MBMS layer and a value for HCS_PRIO is associated with the non-MBMS layer Typically in a network using HCS, macro-cells have lower priority than micro-cells. That is, HCS_PRIO is different for each layer, and in FIG. 1 HCS_PRIO is equal to 3 in the micro-cells and is equal to 2 in the macro-cell. Since the macro layer is the MBMS layer a change of priority is required to reselect onto the MBMS layer for an MBMS session. That is, for networks using HCS, the HCS priority is modified by changing HCS_PRIO.

Hence, if a network uses HCS and HCS priorities are not aligned with the MBMS priorities, HCS_PRIO is changed for the MBMS layer upon notification. This could be provided by means of frequency identification and an offset value to the parameter HCS_PRIO or an actual replacement value for HCS_PRIO. The FLC parameters may be sent e.g. in the session control start message on MCCH or via SIB (System Information Block types).

In FIG. 1 HCS_PRIO of the cell on the MBMS layer is changed from 2 to 4 so as to have a higher HCS priority (HCS_PRIO) than the non-MBMS layer (for which HCS_PRIO is set at 3) for UEs that are notified to use the FLC. A change of priorities occurs after the notification. For other UEs HCS_PRIO remains unchanged. In this example the HCS_PRIO is changed from 2 to 4, which means that the MBMS layer has higher priority for UEs that are notified to use the FLC. For other UEs HCS_PRIO remains at 2. In the case where the HCS priority and MBMS priority are the same in the network no changes are required to the HCS priority. In this case the network may either use FLC or decide to keep the normal cell reselection criteria for UEs that are notified about the start of a MBMS session.

When the MBMS session is finished, the priorities are changed back to their original values and in the example shown in FIG. 1 the UE would reselect back to the micro-cell with a HCS_PRIO of 3.

The high mobility rules of the normal HCS priorities may not be valid for MBMS due to different prioritization. In this case the UE should not use the existing HCS high mobility triggers and prioritization of lower HCS priority layers when high mobility would be triggered based on the normal HCS high mobility triggers defined in 25.346 v.6.0.0. This can be obtained either by explicitly defining in the specification that when the FLC is used, high mobility triggers and rules criteria should not be used or by a special signaling element that indicates whether high mobility triggers and criteria should be used in the FLC case as well.

The re-selection to the MBMS layer may either occur when the UE has evaluated the H criterion of a cell in the MBMS layer to be higher than 0 (H is defined in TS25.304) or immediately after the notification. In the case of the initial cell reselection initiated by the FLC, the UE may disregard the penalty time and TEMP_OFFSET in order to allow faster frequency layer convergence. In the case where the UE evaluates H>0, this would ensure a minimum quality for a cell in the MBMS layer before convergence occurs. In cell reselections, when the FLC is active, the UE selects a cell with the highest R value (the R criterion is defined in TS25.304) on the preferred MBMS layer as long the H criterion (H>0) is met for the MBMS layer. The cell selection criterion S in 25.304 has to be met for a cell that the UE selects/reselects based on the FLC criteria in order to ensure that the UE is camped on a suitable cell. In case of the initial cell reselection after the FLC has been activated the UE may choose a cell reselection initiated by the FLC the UE may disregard the penalty time and TEMP_OFFSET in order to allow faster on the preferred MBMS frequency layer convergence. Furthermore, in the first cell reselection after the FLC has been activated the UE may choose a MBMS layer cell that fulfils S and H criterion but it does not necessarily have the highest R value. In the following cell reselection the UE should select a cell, which has the highest R value and fulfill the S and H criterion. The immediate FLC would provide a shorter convergence time.

FIGS. 2 and 3 show schematic diagrams of a portion of a network not having a hierarchical cell structure. If a network does not use HCS, the offset used in the R criterion is changed in order to control cell selection for MBMS. The R criterion is defined in TS25.304. That is, $Q_{offset}$ in the R criterion is changed. In FIG. 2, the serving cell is not on the MBMS layer. In FIG. 3, the serving cell is on the MBMS layer.

The change of offset value for the cells of the MBMS layer could either be done by signaling an additional Qflcoffset t, which is valid for the cells on the MBMS carrier frequency. In case of several MBMS layers Qflcoffset should be signaled for each MBMS frequency. This offset(s) would be provided upon notification. The FLC parameters may be sent e.g. in the session control start message on MCCH or via SIB (System Information Block types). Qflcoffset and can be done in 2 ways as discussed below $R_a$ for all the neighbour cells on the desired MBMS layer would then be calculated as follows:

Serving cell $R_s = Q_{meas,s} + Qhyst_s$

Neighbour cells $R_n = Q_{meas,n} - Q\text{offset}_{s,n} + (F) * Qflc\text{offset} - TO_n * (1 - L_n)$ Where:
F=1 if the serving cell is not on the preferred MBMS frequency but neighbour cell n is on the MBMS preferred frequency F=0 if neither the serving cell nor neighbour cell n are on the MBMS preferred frequency F=−1 if the serving cell is on the preferred MBMS frequency but neighbour cell n is not on the MBMS preferred frequency F=0 if the serving cell and neighbour cell n are on the MBMS preferred frequency Another method would be to signal a new offset value that would then replace the $Q\text{offset}_{s,n}$ values of all the neighbour cells on the desired MBMS layer.

The UE would then reselect the cell, that has the highest R value. (The R criterion and parameters are defined in TS25.304). In the case of the initial cell reselection initiated by the FLC, the UE may disregard the penalty time and TEMP_OFFSET in order to allow faster frequency layer convergence. The cell selection criterion S in 25.304 has to be met for a cell that the UE selects/reselects based on the FLC criteria in order to ensure that the UE is camped on a suitable cell. In the first cell reselection after the FLC has been activated the UE may choose a MBMS layer cell on the preferred MBMS frequency layer that fulfils S but it does not necessarily have the highest R value. In the following cell reselection the UE should select a cell, which has the highest R value and fulfill the S and H criterion.

The UE would then reselect the cell with the highest R value. (The R criterion and parameters are defined in TS25.304). In the case of the initial cell reselection initiated by the FLC, the UE may disregard the penalty time and TEMP_OFFSET in order to allow faster frequency layer convergence.

Thus, the FLC could occur immediately after the notification and after that the UE would follow the new FLC parameters and corresponding cell reselection criteria until the MBMS session ends. After this initial immediate reselection of MBMS layer, the UE would follow the normal cell reselection criteria with the modified offset value(s) for the MBMS layer(s).

Alternatively, the new MBMS cell may have to be better ranked than the serving cell during a time interval $T_{reselection}$ before cell reselection occurs. This would cause additional delay to cell reselection but it is reasonable if the value of $T_{reselection}$ is not high. The parameter range of $T_{reselection}$ may be set from 0 to 31 seconds with a step of 1 second. Alternatively The cell selection criterion S in 25.304 has to be met for a cell that the UE selects/reselects based on the FLC criteria in order to ensure that the UE is camped on a suitable cell.

When the MBMS session is finished, the $Q_{offset}$ values would be changed back to normal.

The FLC parameters and cell reselection rules are valid during the MBMS session. When the MBMS session ends the UE starts using normal cell reselection parameters and criteria again (i.e. the HCS_PRIO is changed to the normal values given in the system information for normal cell reselection and the Qflcoffset is no longer used in cell reselections).

The above described methods are implemented as follows.

The UTRAN (RNC) sends parameters related to the FLC when it notifies the UE that the MBMS session will start. This may be done e.g. in the session control start message on MCCH or via SIB (System Information Block types).

When the FLC is used in the network, the UE has to indicated a session stop so that the UE can start using normal cell reselection parameters and criteria again.

The UE reads the FLC parameters when it has been notified that the MBMS session starts and start using the FLC cell reselection parameters in cell reselection (in order to make frequency layer convergence possible).

When the MBMS session ends the UE reverts back to the normal cell reselection rules.

This invention provides a working FLC method (cell reselection criteria) for MBMS in a network with and without HCS. The method is backwards compatible—i.e. can be used with all R99 features, including HCS. R99 re-selection rules remain as they are.

Advantages of the HCS case are:
Simple solution. It works by merely assuming different values of HCS_PRIO for a certain frequency.
If re-selection to the MBMS layer only occurs when H>0, we ensure t a minimum quality before convergence occurs.

Advantages of the non-HCS case are:
Simple solution. It works by merely assuming different Qoffset value for a certain frequency.

Other embodiments of the present invention are also envisaged. For example, the present invention may also be utilized in providing other types of service in a RAN.

The system is preferably a 3G/UMTS system, or a derivative thereof, but the present invention could be used in other systems.

There follows a further description of an illustrative example of the invention.

1. Introduction

The Frequency Layer Convergence (FLC) concept was included to [4] in RAN2#40 introduced based on revised text from [3]. The intention behind the FLC concept is to maximise the p-t-m connections for an MBMS session, from the RNC point of view. This is because MBMS in p-t-p would not present many advantages over the R99 DCH connection since the same radio resources are consumed. It is currently not possible to converge a UE to a certain cell or frequency in the following RRC states: Idle, CELL_FACH, CELL_PCH.

Even though included in the [4], The FLC description is still at a general level, and requires further refinement before stage-3 work can be started. In this contribution, we present a Nokia view on the requirements and assumptions related to FLC concept. Based on those, we identify the impact of FLC to some MBMS procedures/features and propose the changes to be made to various parts of [4] to explicitly describe this impact as well as the underlying assumptions.

2. Discussion 2.1. FLC Assumptions and Requirements

In documents R2-031716, R2-032077 and R2-040086 the FLC concept is discussed. However, the text describing FLC in [4] does not capture all the underlying assumptions. According our view, at least the following assumptions are valid:

1. Not all MBMS capable UEs should reselect to the MBMS layer.

Only the UEs that have activated the MBMS user service for which a session is starting shall have moved to the MBMS layer. This will avoid all MBMS UEs that have activated other MBMS service reselecting always to the same frequency when any MBMS service is transmitted and minimise the migration trend of MBMS UEs towards bigger cells although normal cell reselection parameters would prioritise smaller cells e.g. on micro layer.

2. The FLC shall only be active after the reception of notification.

(This implies that MICH and MCCH are present at all cells to deliver session start signalling). It is not stated clearly in [4] whether the UE should move when joining the session or when it is notified. Nokia's preference the latter one since it allows the FLC to happen only when it is needed i.e. when the session starts. This is important since cell re-selection based on the FLC is not typically indicating the best cell to camp on based on the normal cell reselection rules that are in use in the network. MICH and MCCH in each cell, counting at target frequency. There needs to be a delay to allow re-selection.

3. There shall be an explicit session stop to indicate disabling the FLC.

Since FLC will typically present a less optimum cell re-selection, the time the UE spends actively using this feature should be minimised.

4. FLC-based cell re-selection should only occur on the areas where the Preferred MBMS frequency layer can provide acceptable quality.

Required limitations: FLC can only occur in cells which overlap in coverage and the adjacent cells must be at the same frequency. It has recently been discussed in RAN2 that the FLC should only occur in case of co-located cells. We have made some further analyses on how to ensure smooth initial frequency layer convergence and to maintain the UE on the preferred MBMS layer as long as session is active and the preferred MBMS frequency layer can provide acceptable quality (i.e. at least the S criterion is met). We found out that it is rather easy to define what the co-location requirement mean in case of initial frequency layer convergence but it becomes a bit more complicated when the UE starts making cell re-selections within the MBMS layer. All cells on the MBMS layer could potentially be co-located with a cell on another frequency, potentially the one from where the initial FLC was made. It may be possible to define acceptable FLC cell re-selection rules that fulfil the requirements set by this document.

There is preferably no attempt to converge UEs towards a specific cell, because this would cause high interference on neighbouring cells. Instead general FLC layer rules, which are valid for all neighbour cells on the MBMS layer, should be defined.

6. FLC shall be backwards compatible—i.e. allow interworking with the existing cell reselection criteria 7. FLC shall be available for networks with and without HCS.

8. It is assumed the MBMS layer also provides R99/4/5 services independently of MBMS services—i.e. R99/4/5 UEs may also camp on the MBMS layer cells.

2.2. Impact on Other MBMS Procedures/Features

Reasoning:

1. FLC is only available during MBMS session. (The consequence of 2 and 3 is that)

2. FLC needs to use a cell reselection based method. This means that the UE will select the best cell, based on a set of modified rules given by the network. The network is able to switch this feature ON/OFF, with the start/finish of the MBMS session.

3. Session start procedure needs to be enhanced to take FLC into account.

4. Session stop procedure needs to be used, if FLC is used.

5. MICH and MCCH needs to be present also in all cells within the MBMS service geographical area, even if there is no MTCH.

4. Proposal

It is proposed that the following changes should be agreed to be included in the TS. Once there is an agreement, CR can be made, or another action can be taken.

>>>>>>>>>>Start of the modification #1<<<<<<<<<

6.3. MBMS Notification Indicator Channel

MBMS notification utilizes a new MBMS specific PICH called MBMS Notification Indicator Channel (MICH) in cell. MICH frame is presented in the following figure. The exact coding is defined in Stage-3 physical layer specifications. When FLC is used, MICH channel can be present in a cell independently of the presence of MTCH channels.

300 bits
MICH frame used in MBMS notification

>>>>>>>>>>End of the modification #1<<<<<<<<<
>>>>>>>>>>Start of the modification #2<<<<<<<<<

8.1.1 Session Start

Upon receiving a session start indication from CN, UTRAN initiates the session start sequence to allocate radio resources to UEs for receiving the MBMS content. As part of this sequence, UTRAN may apply the counting procedure (counting the number of idle mode UEs) to decide whether to use the p-t-m or p-t-p transfer mode. The FLC may also be activated during session start sequence, which may cause cell re-selection during the session start sequence. In this case, cell re-selection shall take place after MCCH is read.

Figure 5:
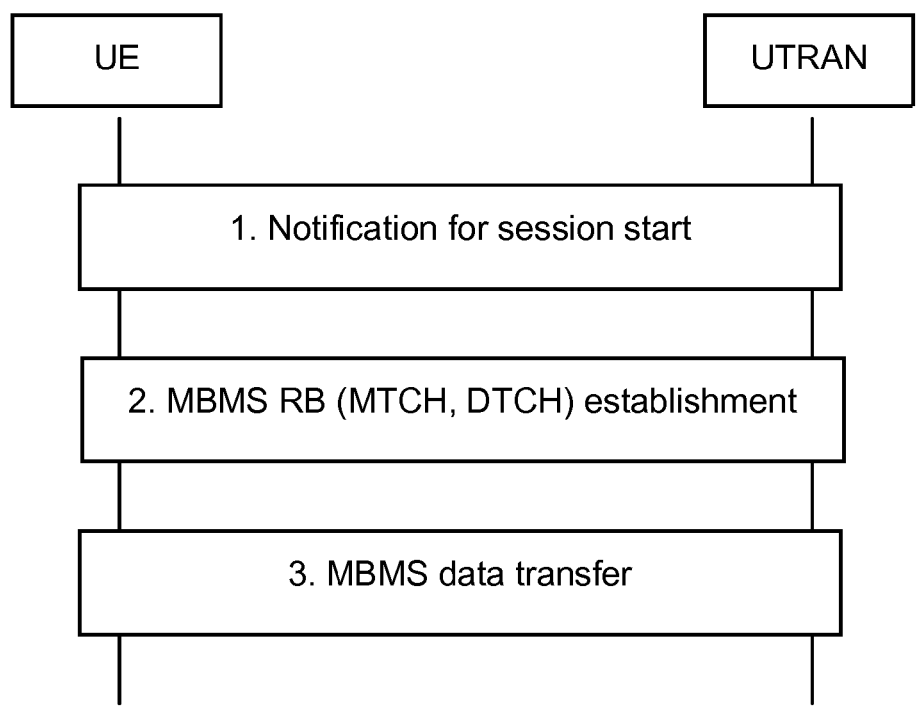
FIG. 5 is an example of a possible session start sequence.

FIG. 5 shows an example of a possible session start sequence.

In general, the session start sequence involves the following steps:

In case UTRAN applies counting to determine the most optimal transfer mode, it may first apply conventional paging to move UEs in URA_PCH to CELL_PCH state. Next, the following steps are performed:

UTRAN sets the correct MBMS Notification Indicator (NI) and sends the MBMS ACCESS INFORMATION including service ID, and access probability on MCCH.

Upon DRX wakeup, UEs in idle mode as well as UEs in CELL_PCH, URA_PCH and CELL_FACH not receiving an MBMS service provided in p-t-m transfer mode evaluate the MBMS NI and if set, read MCCH at the pre-defined time(s). Upon receiving the MBMS ACCESS INFORMATION including access probability, UEs in idle mode for which the probability check passes, initiate RRC connection establishment to move to PMM CONNECTED. RRC Connected mode UEs ignore the MBMS ACCESS INFORMATION. UTRAN counts the UEs interested in the MBMS service using UE linking from CN In case a pre-defined threshold is reached, UTRAN applies the p-t-m RB establishment procedure specified below. Otherwise, UTRAN may repeat the MBMS ACCESS INFORMATION a number of times, using different probability values. If the threshold is not reached, UTRAN applies the p-t-p RB establishment procedure NOTE: The NIs are evaluated by UEs in CELL_PCH, URA_PCH and CELL_FACH that are not receiving an MBMS service that is provided using p-t-m transfer mode. In this section these UEs are referred to as NI-detecting connected mode UEs'. The UEs in CELL_PCH, URA_PCH, CELL_FACH and CELL_DCH that are receiving an MBMS service that is provided using p-t-m transfer mode receive the Secondary Notification Indicator (SNI) instead. The latter UEs are referred to as 'SNI detecting connected mode UEs'.

In case UTRAN selects the p-t-m RB establishment procedure:

UTRAN configures MTCH and updates MCCH (MBMS SERVICE INFORMATION and MBMS RADIO BEARER INFORMATION) by including the service ID and p-t-m RB information for the concerned MBMS service In case p-t-m RB establishment is not preceded by counting, UTRAN sets the correct MBMS Notification Indicator (NI). Regardless of counting, UTRAN also provides the Secondary Notification Indicator.

UTRAN sends the MBMS dedicated notification message including the service ID and cause=session start on DCCH to inform UEs in CELL_DCH that are not receiving an MBMS service provided using p-t-m transfer mode In case p-t-m RB establishment is preceded by counting, UEs in idle mode as well as NI-detecting connected mode UEs read MCCH at the pre-defined time(s) to acquire the MBMS SERVICE INFORMATION and MBMS RADIO BEARER INFORMATION In case p-t-m RB establishment is not preceded by counting, Upon DRX wakeup, UEs in idle mode as well as NI-detecting connected mode UEs evaluate the MBMS NI and if set, read MCCH at the pre-defined time(s) to acquire the MBMS SERVICE INFORMATION and MBMS RADIO BEARER INFORMATION Upon detecting the MBMS SNI, SNI-detecting connected mode UEs read MCCH at the pre-defined time(s) to acquire the MBMS SERVICE INFORMATION and MBMS RADIO BEARER INFORMATION. UEs that are incapable of receiving the MTCH for the session that is started in parallel to the existing activity notify the user. This enables the user to choose between the ongoing activity and the new MBMS service Upon receiving MBMS dedicated notification with cause=session start, UEs in CELL_DCH that are incapable of receiving the MCCH and the corresponding MTCH in parallel to the existing activity notify the user. This enables the user to choose between the ongoing activity and the new MBMS service. If the user decides to receive the new MBMS service, the UE shall read MCCH at the pre-defined time(s) to acquire the MBMS SERVICE INFORMATION and MBMS RADIO BEARER INFORMATION.

Upon receiving the MBMS SERVICE INFORMATION and the MBMS RB INFORMATION including the p-t-m RB information for the concerned MBMS service, the UE starts receiving the p-t-m radio bearers In case UTRAN selects the p-t-p RB establishment procedure:

UTRAN applies conventional paging to trigger UEs in CELL_PCH to perform cell update. Furthermore, UTRAN establishes the p-t-p RB by means of appropriate RRC procedures eg. the RB setup procedure UEs establish the p-t-p radio bearers by means of the RRC procedure selected by UTRAN eg. the RB setup procedure UTRAN updates MCCH (MBMS SERVICE INFO) to inform UEs joining or entering the cell at a later point in time.

>>>>>>>>>>>End of the modification #2<<<<<<<<<<
>>>>>>>>>>>Start of the modification #3<<<<<<<<<<

8.1.4 Session Stop

UTRAN may apply the session stop procedure to inform UEs that the end of MTCH transmission concerns the end of a session rather than just an idle period. The purpose of the procedure is to reduce the UE power consumption and to allow the UE to disable the frequency layer convergence functionalities when there are no ongoing MBMS sessions requiring the use of FLC. When FLC is applied UTRAN shall apply session stop procedure.

Figure 6:
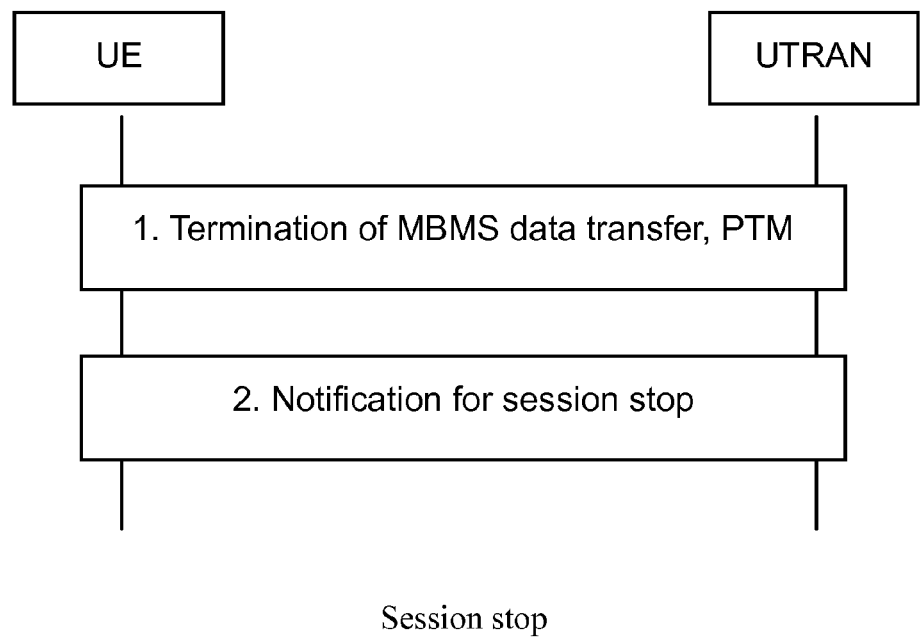
FIG. 6 is an example of a possible session stop sequence.

FIG. 6 shows an example of a possible session stop sequence.

In case UTRAN provides the service p-t-m, the session stop sequence involves the following steps:

UTRAN sets the correct MBMS NI and provides the SNI

Upon DRX wakeup, UEs in idle mode as well as NI detecting connected mode UEsevaluate the MBMS NI and if set, read MCCH at the pre-defined time(s) to acquire the required MCCH information. Upon receiving this information the UE stops receiving the MTCH Upon detecting the MBMS SNI, SNI-detecting connected mode UEs read MCCH at the pre-defined time(s) to acquire the required MCCH information. Upon receiving this information the UE stops receiving the MTCH In case UTRAN provides the service p-t-p, the session stop sequence involves the following steps:

UTRAN releases the p-t-p radio bearers and updates MCCH (MBMS SERVICE INFO) to inform UEs joining or entering the cell at a later point in time.

>>>>>>>>>>>End of the modification #3<<<<<<<<<
>>>>>>>>>>>Start of the modification #4<<<<<<<<<

11.2 Frequency Layer Convergence

Frequency Layer Convergence denotes the process where the UTRAN requests UEs to preferentially re-select to the frequency layer on which the MBMS service is intended to be transmitted. This layer preference could be done by an additional MBMS session related Layer Convergence Information (LCI) such as offset and target frequency. These kinds of information could be given to UEs at session start and during the whole session, and will be applied during the entire session. More than one offset may be required to support multiple frequencies, but it is assumed that the same LCI information will apply to all the services on the same frequencies. The details of the mechanism are defined in state 3, but the mechanism should fulfil the following requirements:

Not all MBMS capable UEs should reselect to the MBMS layer.

The FLC shall only be active after the reception of notification.

There shall be an explicit session stop to indicate disabling the FLC.

FLC-based cell re-selection should only occur on the areas where the preferred MBMS frequency layer can provide acceptable quality FLC shall be backwards compatible—i.e. allow interworking with the existing cell reselection criteria FLC shall be available for networks with and without HCS.

It is assumed the MBMS layer also provides R99/4/5 services independently of MBMS services—i.e. R99/4/5 UEs may also camp on the MBMS layer cells.

>>>>>>>>>>>End of the modification #4<<<<<<<<<

REFERENCES

[1] R2-031716
[2] R2-032077
[3] R3-040086
[4] 25.346 v.6.0.0

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method, comprising:
   determining that a user equipment is receiving a session for a multimedia broadcast-multicast service, the multimedia broadcast-multicast service using a preferred frequency layer;
   changing at least one cell selection or re-selection parameter for the user equipment such that when a subsequent cell selection or re-selection occurs the user equipment favors cells providing the multimedia broadcast-multicast service and using the preferred frequency layer over other cells; and
   transmitting to one or more user equipment a message indicating a value for a parameter that, if adopted by the one or more user equipment, would inhibit the one or more user equipment from subsequently selecting a different cell from a cell with which the one or more user equipment is currently operating.

2. The method as claimed in claim 1, wherein the service uses one or more reception frequencies, the at least one cell selection or re-selection parameter having an effect that a subsequent cell selection or re-selection for the user equipment would favor cells that use the at least one reception frequency.

3. The method as claimed in claim 1, further comprising: identifying whether given cells are hierarchical and, based on the determination, selecting which of the cell selection or reselection parameters is to be changed in said changing.

4. The method as claimed in claim 1, wherein the changing of the at least one cell selection or re-selection parameter comprises sending, from a network node to the user equipment, data identifying a value for the parameter.

5. The method as claimed in claim 4, wherein, in the changing, the data is sent using at least one of a session control start message and a system information data message.

6. The method as claimed in claim 1, further comprising: starting the session, wherein said determining is performed in response to the starting of the session.

7. The method as claimed in claim 1, wherein the changing further comprises setting a parameter so as to encourage the user equipment to select or re-select a cell more promptly.

8. The method as claimed in claim 1, wherein the changing further comprises setting a parameter that reduces responsiveness of the user equipment to high mobility triggers.

9. The method as claimed in claim 1 wherein the at least one cell selection or re-selection parameters comprises a hierarchical cell structure priority parameter, an R criterion, or an offset thereto.

10. A method, comprising:
    transmitting to one or more user equipment which are receiving a session for a multimedia broadcast-multicast service, the multimedia broadcast-multicast service using a preferred frequency layer, a message indicating a value for at least one cell selection or re-selection parameter such that when a subsequent cell selection or re-selection occurs the one or more user equipment favor cells providing the multimedia broadcast-multicast service and using the preferred frequency layer over other cells; and
    transmitting to one or more user equipment a second message indicating a value for a second parameter that, if adopted by the one or more user equipment, would inhibit the one or more user equipment from subsequently selecting a different cell from a cell with which the one or more user equipment is currently operating.

11. The method as claimed in claim 10, further comprising:
determining, for the one or more user equipment, whether reception of the service session is desired, wherein the determining is performed by a network and the message is transmitted only to user equipment for which the user equipment is determined that reception of the service session is desired.

12. The method as in claim 10, further comprising:
determining, for the one or more user equipment, whether reception of the service session is desired; wherein the determining is performed by a network and the second message is transmitted only to those user equipment for which those user equipment is determined that reception of the service session is desired.

13. The method as claimed in claim 10, wherein the service uses one or more reception frequencies, the at least one cell selection or re-selection parameter having an effect that a subsequent cell selection or re-selection for the user equipment would favor cells that use the at least one reception frequency.

14. A method, comprising:
receiving, at a user equipment, a message indicating a value for at least one cell selection or re-selection parameter, wherein the user equipment is configured to receive a session for a multimedia broadcast multicast service, the multimedia broadcast-multicast service using a preferred frequency layer, wherein when a subsequent cell selection or re-selection occurs the user equipment favors cells providing the multimedia broadcast-multicast service and using the preferred frequency layer over other cells;
adopting the value indicated in the message for the parameter in the user equipment;
receiving at the user equipment a second message indicating a value for a second parameter that, if adopted, would inhibit the subsequent selection for the user equipment of a different cell from a cell with which the user equipment is currently operating; and adopting the value indicated in the second message for the second parameter in the user equipment.

15. The method as claimed in claim 14, further comprising:
determining, for the user equipment, whether reception of the service session is desired; and adopting the value indicated in the message for the parameter for the user equipment only if determined that reception of the service session by the user equipment is desired.

16. The method as claimed in claim 15, wherein the determining is performed by the user equipment, the message being broadcasted or multicasted to a plurality of user equipment.

17. The method as in claim 14, further comprising:
determining, for the user equipment, whether reception of the service session is desired; and
adopting the value indicated in the second message for the second parameter for the user equipment only if determined that the user equipment desires reception of the service session.

18. The method as claimed in claim 17, wherein the determining is performed by the user equipment, the second message being broadcasted or multicasted to a plurality of user equipment.

19. The method as claimed in claim 14, wherein the service uses one or more reception frequencies, the at least one cell selection or re-selection parameter having an effect that a subsequent cell selection or re-selection for the user equipment would favor cells that use the at least one reception frequency.

20. An apparatus, comprising:
at least one memory including computer program code; and
at least one processor,
wherein the at least one memory and the computer program code are configured to, with the at least one processor, cause the apparatus at least to
determine that a user equipment is receiving a session for a multimedia broadcast multicast service, the multimedia broadcast-multicast service using a preferred frequency layer;
change, based on the determination, at least one cell selection or re-selection parameter with respect to the user equipment, such that when subsequent cell selection or re-selection occurs the user equipment favors cells providing the multimedia broadcast-multicast service and using the preferred frequency layer over other cells; and
transmitting to one or more user equipment a message indicating a value for a parameter that, if adopted by the one or more user equipment, would inhibit the one or more user equipment from subsequently selecting a different cell from a cell with which the one or more user equipment is currently operating.

21. The apparatus as claimed in claim 20, wherein the apparatus comprises a radio network controller.

22. The apparatus as claimed in claim 20, wherein the service uses one or more reception frequencies, the at least one cell selection or re-selection parameter having an effect that a subsequent cell selection or re-selection for the user equipment would favor cells that use the at least one reception frequency.

23. The apparatus as claimed in claim 20, wherein the at least one memory and the computer program code are also configured to, with the at least one processor, cause the apparatus at least to identify whether given cells are hierarchical and, based the determination, selecting which of the cell selection or reselection parameters is to be changed.

24. The apparatus as claimed in claim 20, wherein the at least one memory and the computer program code are also configured to, with the at least one processor, cause the apparatus at least to send, to the user equipment, data identifying a value for the at least one parameter.

25. The apparatus as claimed in claim 24, wherein the at least one memory and the computer program code are also configured to, with the at least one processor, cause the apparatus at least to send the data using at least one of a session control start message and a system information data message.

26. The apparatus as claimed in claim 20, wherein the at least one memory and the computer program code are also configured to, with the at least one processor, cause the apparatus at least to receive notification of a starting of the session, wherein determining is performed in response to the notification of the starting of the session.

27. The apparatus as claimed in claim 20, wherein the at least one memory and the computer program code are also configured to, with the at least one processor, cause the apparatus at least to set a parameter that reduces responsiveness of the user equipment to high mobility triggers.

28. The apparatus as claimed in claim 20, wherein the at least one memory and the computer program code are also configured to, with the at least one processor, cause the apparatus at least to set a parameter so as to encourage the user equipment to select or re-select a cell more promptly.

29. The apparatus as claimed in claim 20 wherein the at least one cell selection or re-selection parameters comprises a hierarchical cell structure priority parameter, an R criterion, or an offset thereto.

30. An apparatus, comprising:
at least one memory including computer program code; and
at least one processor,
wherein the at least one memory and the computer program code are configured to, with the at least one processor, cause the apparatus at least to
transmit to one or more user equipment which are receiving a session for a multimedia broadcast-multicast service, the multimedia broadcast-multicast service using a preferred frequency layer, a message indicating a value for at least one cell selection or re-selection parameter such that, when a subsequent cell selection or re-selection occurs the one or more user equipment favor cells providing the multimedia broadcast-multicast service and using the preferred frequency layer over other cells; and to
cause the apparatus at least to transmit to one or more user equipment a second message indicating a value for a second parameter that, if adopted by the one or more user equipment, would inhibit the one or more user equipment from subsequently selecting a different cell from a cell with which the one or more user equipment is currently operating.

31. The apparatus as claimed in claim 30, wherein the at least one memory and the computer program code are also configured to, with the at least one processor, cause the apparatus at least to determine, for the one or more entities, whether reception of the service session is desired, and the message is transmitted only to user equipment for which determined that the one or more entities desires reception of the service session.

32. The apparatus as in claim 30, wherein the at least one memory and the computer program code are also configured to, with the at least one processor, cause the apparatus at least to determine, for the one or more user equipment, whether reception of the service session is desired; and the second message is transmitted only to those user equipment for which determined those user equipment that desire reception of the service session.

33. An apparatus, comprising:
at least one memory including computer program code; and
at least one processor,
wherein the at least one memory and the computer program code are configured to, with the at least one processor, cause the apparatus at least
to receive a message indicating a value for at least one cell selection or re-selection parameter such that when a subsequent cell selection or re-selection for the apparatus which is receiving a session for a multimedia broadcast multicast service occurs, the multimedia broadcast-multicast service using a preferred frequency layer, the apparatus favors cells providing the multimedia broadcast-multicast service and using the preferred frequency layer over other cells;
adopt the value indicated in the message for the parameter; and to
cause the apparatus at least to receive a second message indicating a value for a second parameter that, if adopted by the apparatus, would inhibit the apparatus from subsequently selecting a different cell from a cell with which the apparatus is currently operating; and adopt the value indicated in the second message for the second parameter.

34. The apparatus as claimed in claim 33, wherein the at least one memory and the computer program code are also configured to, with the at least one processor, cause the apparatus at least to
determine whether reception of the service session is desired; and
adopt the value indicated in the message for the parameter only if it is determined that reception of the service session is desired.

35. The apparatus as in claim 33, wherein the
at least one memory and the computer program code are also configured to, with the at least one processor, cause the apparatus at least to determine, for the apparatus, whether reception of the service session is desired; and adopt the value indicated in the second message for the second parameter only if determined that reception of the service session is desired.

* * * * *